(12) United States Patent
Kamm et al.

(10) Patent No.: US 7,713,161 B2
(45) Date of Patent: May 11, 2010

(54) MULTI-SPEED TRANSMISSION

(75) Inventors: Michael Kamm, Bodnegg (DE); Gabor Diosi, Friedrichshafen (DE); Josef Haupt, Tettnang (DE); Gerhard Gumpoltsberger, Friedrichshafen (DE); Peter Ziemer, Tettnang (DE); Martin Brehmer, Konstanz (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 413 days.

(21) Appl. No.: 11/800,731

(22) Filed: May 7, 2007

(65) Prior Publication Data

US 2007/0270276 A1 Nov. 22, 2007

(30) Foreign Application Priority Data

May 18, 2006 (DE) ........................ 10 2006 023 302

(51) Int. Cl.
*F16H 3/44* (2006.01)
(52) U.S. Cl. ........................ 475/282; 475/277; 475/288; 475/311; 475/317; 475/330
(58) Field of Classification Search ................. 475/277, 475/282, 283, 288, 289, 296, 297, 303, 311–313, 475/317–319, 330
See application file for complete search history.

(56) References Cited

U.S. PATENT DOCUMENTS

| 3,979,974 | A | * | 9/1976 | Murakami | .................. 475/283 |
| 6,176,803 | B1 | | 1/2001 | Meyer et al. | |
| 6,634,980 | B1 | | 10/2003 | Ziemer | |
| 6,811,512 | B2 | * | 11/2004 | Usoro et al. | ................ 475/276 |
| 6,960,149 | B2 | | 11/2005 | Ziemer | |
| 6,976,930 | B2 | * | 12/2005 | Winzeler | .................... 475/277 |
| 7,014,589 | B2 | | 3/2006 | Stevenson | |
| 7,018,319 | B2 | | 3/2006 | Ziemer | |
| 7,163,484 | B2 | * | 1/2007 | Klemen | ..................... 475/276 |
| 7,497,802 | B2 | * | 3/2009 | Kamm et al. | ............... 475/282 |
| 7,527,576 | B2 | * | 5/2009 | Kamm et al. | ............... 475/284 |
| 7,544,145 | B2 | * | 6/2009 | Jang | ........................... 475/280 |
| 7,582,040 | B2 | * | 9/2009 | Kamm et al. | ............... 475/282 |
| 7,597,646 | B2 | * | 10/2009 | Kamm et al. | ............... 475/277 |

(Continued)

FOREIGN PATENT DOCUMENTS

DE 42 34 572 A1 4/1994

(Continued)

*Primary Examiner*—Tisha D Lewis
(74) *Attorney, Agent, or Firm*—Davis & Bujold, P.L.L.C.

(57) ABSTRACT

A transmission having input and output shafts, planetary gearsets (RS1, RS2, RS3, RS4), and additional shafts and shifting elements. A ring gear of set (RS4) and the input shaft define shaft (1). A carrier of (RS3) and the output define shaft (2). The sun gears of (RS1, RS4) define shaft (3). A ring gear of (RS1) forms shaft (4). A ring gear of (RS2) and a sun gear of (RS3) define shaft (5). A carrier of (RS1) and a ring gear of (RS3) form shaft (6). A sun gear of (RS2) and a carrier of (RS4) define shaft (7). A carrier of (RS2) forms shaft (8). A first element (A) couples shaft (3) to the transmission housing. A second element (B) couples shaft (4) to the housing. A third element (C) couples shafts (1, 5) to one another. A fourth element (D) couples shafts (2, 8) or (6, 8) to one another. A fifth element (E) couples shafts (5, 7), (7, 8) or (5, 8) to one another.

32 Claims, 11 Drawing Sheets

U.S. PATENT DOCUMENTS 7,608,008 B2 * 10/2009 Seo .......................... 475/276
2008/0227587 A1 * 9/2008 Carey et al. ................. 475/283

FOREIGN PATENT DOCUMENTS

| | | |
|---|---|---|
| DE | 199 49 507 A1 | 4/2001 |
| DE | 100 83 202 T1 | 1/2002 |
| DE | 101 15 983 A1 | 10/2002 |
| DE | 101 15 995 A1 | 10/2002 |
| DE | 10 2004 029 952 A1 | 1/2005 |
| DE | 10 2005 002 337 A1 | 8/2006 |
| DE | 10 2005 010 210 A1 | 9/2006 |

* cited by examiner

Fig. 4

| Gear | Engaged Shifting Elements ||||| Ratio i | Step φ |
|---|---|---|---|---|---|---|---|
| | Brake || Clutch |||||
| | A | B | C | D | E | | |
| 1 | ● | ● | ● | | | 4.70 | |
| 2 | ● | ● | | | ● | 3.13 | 1.50 |
| 3 | | ● | ● | | ● | 2.10 | 1.49 |
| 4 | | ● | | ● | ● | 1.67 | 1.26 |
| 5 | | | ● | ● | | 1.29 | 1.30 |
| 6 | ● | | ● | ● | | 1.00 | 1.29 |
| 7 | ● | | | ● | ● | 0.84 | 1.11 |
| 8 | ● | | | ● | ● | 0.67 | 1.26 |
| R | ● | ● | | ● | | -3.28 | TOTAL 7.05 |

| Gear | Engaged Shifting Elements | | | | | Ratio i | Step φ |
|---|---|---|---|---|---|---|---|
| | Brake | | Clutch | | | | |
| | A | B | C | D | E | | |
| 1 | • | • | • | | | 4.70 | |
| 2 | • | • | | | • | 3.13 | 1.50 |
| 3 | | • | • | | • | 2.10 | 1.49 |
| 4 | | • | | • | • | 1.67 | 1.26 |
| 5 | | • | • | • | | 1.24 | 1.35 |
| 6 | | | • | • | | 1.00 | 1.24 |
| 7 | • | | • | • | | 0.87 | 1.15 |
| 8 | • | | | • | • | 0.67 | 1.30 |
| R | • | • | | • | | -5.01 | TOTAL 7 |

Fig. 8

MULTI-SPEED TRANSMISSION

This application claims priority from German Application Serial No. DE 10 2006 023 302.6 filed May 18, 2006.

FIELD OF THE INVENTION

The present invention relates to a multi-speed transmission of planetary construction, in particular an automatic transmission for a motor vehicle comprising an input shaft, an output shaft, four planetary gearsets, at least eight rotatable shafts and five shifting elements, whose selective engagement creates different transmission ratios between the input and output shaft, so that eight forward gears and at least one reverse gear can be implemented.

BACKGROUND OF THE INVENTION

In the state of the art, automatic transmissions, particularly for motor vehicles, comprise planetary gearsets that are shifted by way of friction elements or, as the case may be, shifting elements, such as clutches and brakes, and are usually provided with a starting unit that is subject to a slip effect and optionally provided with a convertor lock-up clutch, such as a hydrodynamic torque converter or a fluid clutch.

In the Applicant's DE 101 15 983 A1, for example, a multi-speed transmission is described that has an input shaft that is connected to a front-mounted gearset, an output shaft that is connected to a rear-mounted gearset, and a maximum of seven shifting elements that can be selectively engaged to create at least seven forward gears without range shifting. The front-mounted gearset consists of a shiftable or non-shiftable planetary gearset or a maximum of two non-shiftable planetary gearsets that are connected to each other. The rear-mounted gearset is configured as a two-carrier, four-shaft transmission with two shiftable planetary gearsets and has four free shafts. The first free shaft of this two-carrier, four-shaft transmission is connected to the first shifting element, the second free shaft to the second and third shifting elements, the third free shaft with the fourth and fifth shifting elements, and the fourth free shaft is connected to the output shaft. For a multi-speed transmission with a total of six shifting elements, the invention proposes that the third free shaft or the first free shaft of the rear-mounted gearset be connected to a sixth shifting element. For a multi-speed transmission with a total of seven shifting elements, the invention proposes that the third free shaft be additionally connected to the sixth shifting element and the first free shaft additionally connected to a seventh shifting element.

Several other multi-speed transmissions are known, for example, from the Applicant's DE 101 15 995 A1, which discloses four shiftable planetary gearsets that are connected to each other, and six or seven fictional shifting elements. The selective engaging of which transmits rotational speed of an input shaft of the transmission to the output shaft of the transmission in such a way that nine or eleven forward gears and at least one reverse gear can be implemented. Depending on the gearbox diagram, two or three shifting elements are engaged in each gear, whereby during shifting from one gear into the next higher gear or the next lower gear, only one engaged shifting element is disengaged and a previously non-engaged shifting element is engaged respectively in order to avoid range shifting.

In addition, the Applicant's generic, unpublished patent application DE 10 2005 002 337.1 proposes a multi-speed transmission with an input shaft, an output shaft, four individual planetary gearsets that are connected with each other, and five shifting elements, in which eight forward gears can be realized without range shifting, i.e., in such a way that, when changing from a forward gear into the next higher or lower forward gear, only one of the previously engaged shifting elements is disengaged, and only one of the previously engaged shifting elements is engaged. The multi-speed transmission also discloses one reverse gear. In all forward gears and in the reverse gear, three shifting elements are engaged respectively. Regarding the kinematic coupling of the four planetary gearsets to each other and to the input and output shaft, it is provided that one carrier of the fourth planetary gearset and the input gear are connected to each other and form a first shaft of the transmission; a carrier of the third planetary gearset and the output shaft are connected to each other and form a second shaft of the transmission; a sun gear of the first planetary gearset and a sun gear of the fourth planetary gearset are connected to each other and form a third shaft of the transmission; a ring gear of the first planetary gearset forms a fourth shaft of the transmission; a ring gear of the second planetary gearset and a sun gear of the third planetary gearset are connected to each other and form a fifth shaft of the transmission; a carrier of the first planetary gearset and a ring gear of the third planetary gearset are connected to each other and form a sixth shaft of the transmission; a sun gear of the second planetary gearset and a ring gear of the fourth planetary gearset are connected to each other and form a seventh shaft of the transmission; and a carrier of the second planetary gearset forms an eighth shaft of the transmission. Relating to the kinematic coupling of the five shifting elements to the four planetary gearsets and to an input and output shaft, it is provided that the first shifting element is arranged in the direction of power flow between the third shaft and a housing of the transmission, the second shifting element between the fourth shaft and a housing of the transmission, the third shifting element between the first and fifth shafts, the fourth shifting element either between the eighth and second shafts or between the eighth and sixth shafts, as well as the fifth shifting element either between the seventh and fifth shafts or between the seventh and eighth or between the fifth and eighth shafts.

Automatically shiftable motorvehicle transmissions in planetary construction have, therefore, in general, been described many times in the state of the art and are subject to continuous further development and improvement. These transmissions should, therefore, have a sufficient number of forward gears and one reverse gear and a transmission ratio that is very well suited to motor vehicles that have a high total ratio spread and favorable gear steps. In addition, they should allow a high starting ratio in a forward direction, contain a direct gear, and be suitable for use in both private and commercial vehicles. In addition, these transmissions should need only simple construction, in particular a small number of shifting elements, and should avoid double shifts by way of a sequential shift mode, so that only one shifting element is engaged or disengaged during shifting within the defined gear ranges.

The present invention is based on the task of proposing a multi-speed transmission of the type cited at the beginning that has at least eight forward gears that are free of range-shifting and at least one reverse gear, which by using a total of four planetary gearsets, requires the smallest possible number of shifting elements. In addition, the transmission should have a large spread with comparatively harmonic gear-stepping and, at least in the main drive gears, a favorable degree of efficiency, i.e., relatively low drag or gearing losses.

SUMMARY OF THE INVENTION

The inventive multi-speed transmission in planetary construction is based on the gearbox diagram in the Applicant's generic patent application DE 10 2005 002 337.1 and discloses an input shaft, an output shaft, four interconnected planetary gearsets, at least eight rotatable shafts, and five shifting elements (two brakes and three clutches), whose elective engagement produces different transmission ratios between the input shaft and the output shaft, so that eight forward gears and one reverse gear can be implimented. In each gear, respectively, three of the five shifting elements are engaged, whereby when shifting from a forward gear into the next higher or lower forward gear, only one of the previously engaged shifting elements is disengaged in each case, and only one of the previously disengaged shifting elements is engaged.

It is inventively proposed that a ring gear of the fourth planetary gearset and the input shaft are permanently connected and form the first shaft of the transmission;
a carrier of the third planetary gearset and the output shaft are permanently connected and form the second shaft of the transmission;
a sun gear of the first planetary gearset and a sun gear of the fourth planetary gearset are permanently connected and form the third shaft of the transmission;
a ring gear of the first planetary gearset forms the fourth shaft of the transmission;
a ring gear of the second planetary gearset and a sun gear of the third planetary gearset are permanently connected and form the fifth shaft of the transmission;
a carrier of the first planetary gearset and a ring gear of the third planetary gearset are permanently connected and form the sixth shaft of the transmission;
a sun gear of the second planetary gearset and a carrier of the fourth planetary gearset are permanently connected and form the seventh shaft of the transmission;
a carrier of the second planetary gearset forms the eight shaft of the transmission;
the first shifting element in arranged in the direction of power flow between the third shaft and a housing of the transmission;
the second shifting element is arranged in the direction of power flow between the fourth shaft and the housing of the transmission;
the third shifting element is arranged in the direction of power flow between the first and fifth shafts of the transmission;
the fourth shifting element is arranged in the direction of power flow either between the second and eighth shaft or between the sixth and eight shafts of the transmission, and
the fifth shifting element is arranged in the direction of power flow either between the fifth and the seventh shafts or between the fifth and eighth shafts or between the seventh and eighth shafts of the transmission.

The inventive multi-speed transmission is thus different from the generic multi-speed transmission of DE 10 2005 002 337.1 in that, as the first shaft of the transmission, the ring gear of the fourth planetary gearset and the input shaft are permanently connected to each other, and in that the sun gear of the second planetary gearset and the carrier of the fourth planetary gearset are permanently connected as the seventh shaft of the transmission.

As in the generic multi-speed transmission according to DE 10 2005 002 337.1, it is also the case in the inventive multi-speed transmission that the first forward gear is produced by engaging the first, second, and third shifting elements; the second forward gear by engaging the first, second and fifth shifting elements; the third forward gear by engaging the second, third, and fifth shifting elements; the fourth forward gear by engaging the second, fourth, and fifth shifting elements; the fifth forward gear by engaging the second, third and fourth shifting elements; the sixth forward gear by engaging the third, fourth, and fifth shifting elements; the seventh forward gear by engaging the first, third, and fourth shifting elements; the eighth forward gear by engaging the first, fourth, and fifth shifting elements; and the reverse gear by engaging the first, second, and fourth shifting elements.

Three of the four planetary gearsets are configured as so-called negative planetary gearsets whose respective planetary gears mesh with the sun gear and ring gear of the respective planetary gearset. One of the four planetary gearsets—specifically the fourth planetary gearset—is configured as a so-called positive planetary gearset with meshing inner and outer planetary gears, whereby the inner planetary gears also mesh with the sun gear of this positive planetary gearset, and whereby the outer planetary gears also mesh with the ring gear of this positive planetary gearset. Regarding the spatial arrangement of the four planetary gearsets in the housing of the transmission, it is proposed, in an advantageous embodiment, that the four planetary gearsets be arranged co-axially parallel to each other in the order "first, fourth, second, third planetary gearset."

The spatial arrangement of the shifting elements of the inventive multi-speed transmission inside the transmission housing is, in principle, limited only by the dimensions and the external form of the transmission housing. Numerous suggestions regarding the spatial arrangement and the constructive design of the shifting elements can be seen, for example, in the generic patent application DE 10 2005 002 337.1.

In a variant that is advantageous for a manual transmission, for example, the shifting elements can be arranged so that the first and the second shifting elements, in spatial terms, are arranged at least partially in an area radially above the first or fourth planetary gearset. The third and fifth shifting elements can be arranged, for example, in spatial terms, at least partially in an area axially between the second and third planetary gearsets, whereby the fifth shift element provided to engage the second planetary gearset is preferably immediately axially adjacent the second planetary gearset. The fifth shifting element can, however, also be arranged on the side of the secondary planetary gearset facing away from the third planetary gearset, that is in an area axially between the second and fourth planetary gearsets, then too, preferably immediately axially adjacent the second planetary gearset. In spatial terms, the fourth shifting element can be arranged at least partially in an area axially between the second and third planetary gearsets or also, in spatial terms, at least partially in an area axially between the fourth and second planetary gearsets. The disc set of the fourth shifting element, for example, can be arranged adjacent to the third planetary gearset or adjacent to the second planetary gearset.

Suitable transmission ratios with a large total ratio spread in harmonic gear-steps are produced, particularly for private motor vehicles, by way of the inventive embodiment of the multi-speed transmission. In addition, with the inventive multi-speed transmission, construction is comparatively simple due to the low number of shifting elements, i.e., two brakes and three clutches. What is more, there is a good degree of efficiency in all gears of the inventive multi-speed transmission, on the one hand, due to low drag loss, as only two shifting elements are not engaged in each gear, and, on the other hand, also as a result of low engaging losses in the simply constructed individual planetary gearsets.

In addition, with the inventive multi-speed transmission, starting is also advantageously possible using a hydrodynamic converter, an external starting clutch, or also with other suitable external starting elements. It is also conceivable to enable the starting process by way of a starting element that is integrated into the transmission. One of the two brakes engaged in the first and second forward gears and in the reverse gear is advantageously suited for this purpose.

In addition, the inventive multi-speed transmission is conceived in such a way that adaptability to various drive train embodiments is possible with respect to both the force-flow direction and spatial considerations. It is possible, for example, without special constructive measures, to optionally arrange the transmission input and output co-axially or axially parallel.

For use with input and output shafts that run co-axially to each other, it is, for example, useful for the first planetary gearset to be the planetary gearset of the inventive planetary gearset group closes the transmission drive. For an application with input and output shafts that run axially parallel or at an angle to each other, the first or the third planetary gearset can be arranged on the side of the transmission housing closes the drive motor that is functionally connected to the input shaft.

In connection with the proposed spatial arrangement of the four planetary gearsets as co-axially parallel in the order "first, fourth, second, third planetary gearsets" and the proposed spatial arrangement of the five shifting elements inside the transmission housing, it is possible, in a constructively advantageous manner, for no more than one shaft respectively of the transmission to pass through the center of a maximum of three of the four planetary gearsets. The constructive configuration of the pressurizing-medium and lubricant supply to the servos of the individual shifting elements is correspondingly simple. In connection with input and output shafts that run co-axially parallel to each other, for example, only the first shaft of the transmission passes through the center of the first, fourth, and secondary planetary gearset. In connection with input and outputs shafts that run axially parallel or at an angle to each other and a first planetary gearset near the drive motor, for example, only the first shaft of the transmission passes through the center of the first, fourth, and secondary planetary gearset. In connection with input and output shafts that run axially parallel or at angle to each other and a third planetary gearset near the drive motor, it can be provided, for example, that only one shaft of the transmission, the first shaft of the transmission, passes through the center of only the third and second planetary gearsets.

In all cases, the third shaft of the transmission, sections of which are formed by the sun gears of the first and fourth planetary gearsets, can be rotationally supported on a hub affixed to the housing. If the first planetary gearset faces the transmission drive, the aforementioned hub affixed to the housing, is part of the drive-side transmission housing; otherwise, it is part of the transmission housing wall opposite the drive motor.

BRIEF DESCRIPTION OF THE DRAWINGS

The invention will now be described, by way of example, with reference to the accompanying drawings in which comparable components are given the same reference characters. The following are shown:

FIG. 4 is an exemplary shift pattern and exemplary gear ratios for the multi-speed transmission according to FIGS. 1, 2, and 3;

FIG. 8 is an exemplary shift pattern and exemplary gear ratios for the multi-speed transmission according to FIGS. 5, 6, and 7.

DETAILED DESCRIPTION OF THE INVENTION

Figure 1:
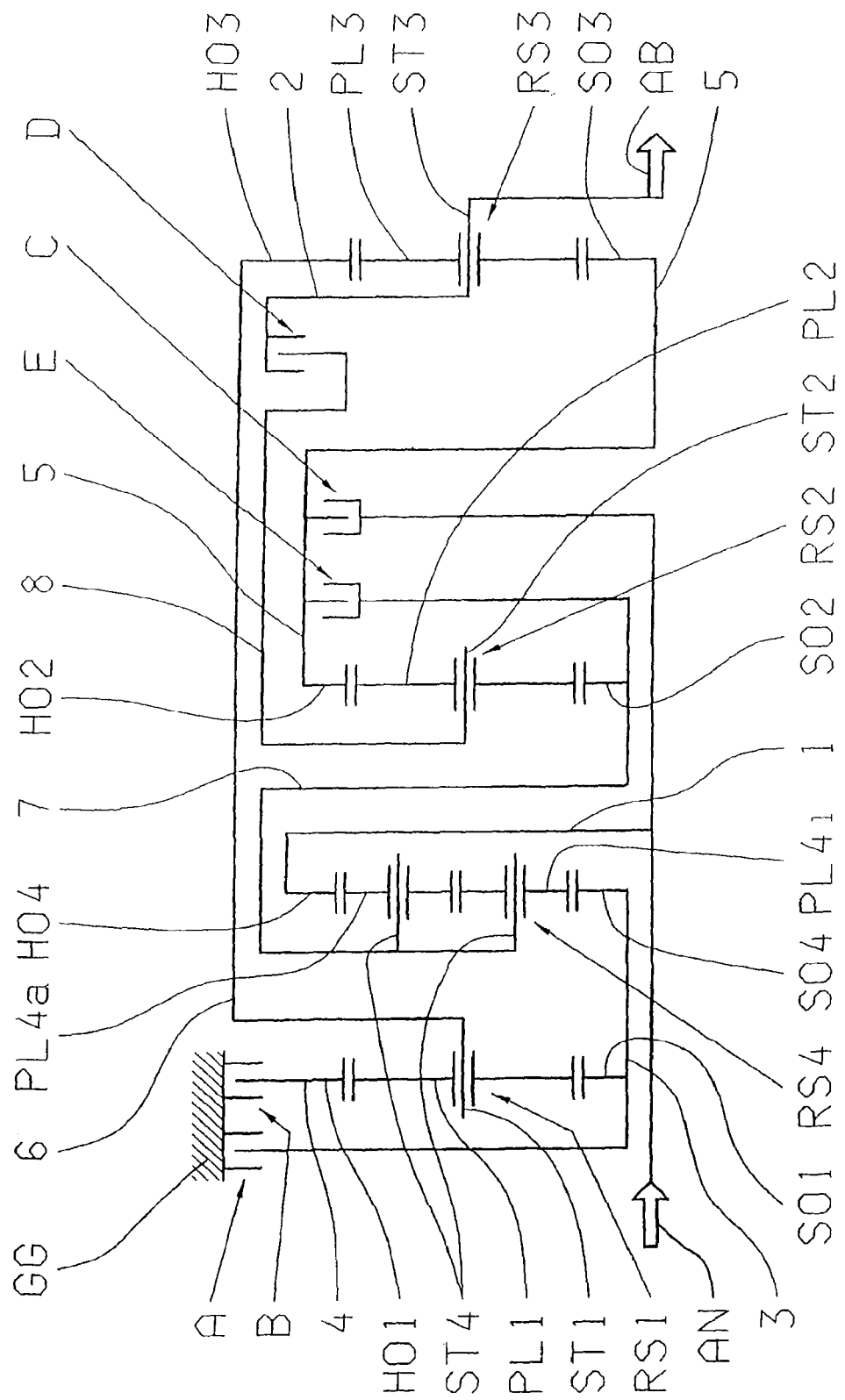
FIG. 1 is a schematic presentation of a first embodiment of a multi-speed transmission according to the invention.

FIG. 1 now shows a first embodiment of a multi-speed transmission according to the invention, in a schematic presentation. The transmission comprises an input shaft AN and an output shaft AB, as well as four planetary gearsets RS1, RS2, RS3, RS4, and five shifting elements A, B, C, D, E, which are all arranged in a housing GG of the transmission. In this embodiment, the four planetary gearsets RS1, RS2, RS3, RS4, are arranged in an axial direction, co-axially one after the other, in the order of "RS1, RS4, RS2, RS3." The planetary gearsets RS1, RS2, and RS3 are configured as simple negative-planetary gearsets. As is well known, a negative-planetary gearset has planetary gears that mesh with the sun and ring gear of the planetary gearset. The ring gears of the planetary gearsets RS1, RS2, RS3 are marked as HO1, HO2, and HO3, the sun gears as SO1, SO2, and SO3, the planetary gears as PL1, PL2, and PL3, and the carriers on which the said planetary gears are rotatably disposed, as ST1, ST2, and ST3. The planetary gearset RS4 is configured as a simple positive-planetary gearset in double planetary construction. As is known, a positive-planetary gearset has inner and outer planetary gears that mesh with each other, whereby these inner planetary gears also mesh with the sun gear of the gearset, and the outer planetary gears also mesh with the ring gear of the planetary set. The ring gear of the planetary set RS4 is marked as HO4, a sun gear as SO4, the inner planetary gears as PL4$i$, the outer planetary gears as PL4$a$, the carrier, on which the inner and outer planetary gears PL4$i$, PL4$a$ are rotatably disposed, is marked as ST4. The shifting elements A and B are configured as brakes, which in the embodiment presented, are both configured as friction-locking, engagable, multi-disc brakes, but can, in a different embodiment, of course, also be configured as friction-locking, engagable, band brakes, or, for example, as form-locking, shiftable claw and or conical brakes. The shifting elements C, D, and E are configured as clutches, which in the embodiment presented are all configured as friction-locking, engagable, multi-disc clutches, but could, of course, in another embodiment also be configured as form-locking, engagable, claw or conical brakes, for example. With these five shifting elements A to E, selective shifting of eight forward gears and at least one reverse gear can be realized. The inventive multi-speed transmission presents altogether at least eight rotatable shafts, that are marked as 1 to 8.

Regarding the kinematic coupling of the individual elements of the four planetary gearsets RS1, RS2, RS3, RS4 to each other and to the input and output shafts AN, AB, the following is provided for: The ring gear HO4 of the fourth planetary gearset RS4 and the input shaft AN are permanently connected as shaft 1. The carrier ST3 of the third planetary gearset RS3 and the output shaft AB are permanently connected as shaft 2. The sun gears SO1, SO4 of the first and fourth planetary gearsets RS1, RS4, are permanently connected as shaft 3. The ring gear HO1 of the first planetary gearset RS1 forms the shaft 4. The ring gear HO2 of the second planetary gearset RS2 and the sun gear SO3 of the third planetary gearset RS3 are permanently connected as shaft 5. The carrier ST1 of the first planetary gearset RS1 and the ring gear HO3 of the third planetary gearset RS3 are permanently connected as shaft 6. The sun gear SO2 of the second planetary gearset RS2 and the coupled carrier ST4 of the fourth planetary gearset RS4 are permanently connected as shaft 7. The carrier ST2 of the second planetary gearset RS2 forms the shaft 8.

With regard to the kinematic coupling of the five shifting elements A to E to the, so described, shafts 1 to 8 of the transmission, the multi-speed transmission according to FIG. 1 provides for the following: The brake A as a first shifting element is arranged in the direction of power flow between the shaft 3 and a housing GG of the transmission. The brake B as second shifting element is arranged in the direction of power flow between the shaft 4 and the housing GG. The clutch C as third shifting element is arranged in the direction of power flow between the shaft 1 and the shaft 5. The clutch D as fourth shifting element is arranged in the direction of power flow between the shaft 2 and the shaft 8. The clutch E as fifth shifting element is arranged when the direction of power flow between the shaft 5 and the shaft 7 and when engaged connects the sun gear SO2 and the ring gear HO2 of the second planetary gearset RS2.

In the embodiment shown in FIG. 1, the first planetary gearset RS1 is the gearset of the transmission closest the input, and the third planetary gearset RS3 is the gearset of the transmission closest the output, whereby the drive shaft AN and the output shaft AB are, for example, arranged co-axially to each other. It is apparent to the person skilled in the art that this transmission can be modified without great effort, such that the input and output shafts are no longer arranged co-axially to each other but are, for example, axially parallel or at an angle to each other. With this kind of arrangement, the person skilled in the art will, if needed, also arrange the input of the transmission near the third planetary gearset RS3, that is, on the side of the third planetary gearset RS3 facing away from the first planetary gearset RS1.

In principle, the spatial arrangement inside the housing of the shifting elements of the embodiment of the inventive multi-speed transmission shown in FIG. 1 is optional and will be limited only by the dimensions and the external form of the transmission housing GG.

In the embodiment shown in FIG. 1, the two brakes A, B, in spatial terms, are arranged in the area of the first planetary gearset RS1, which is here near the input and, in this case, are axially parallel, whereby the kinematic connection of the two brakes A, B to the first planetary gearset RS1 requires that the brake B be closer to the fourth planetary gearset RS4, which is adjacent to the first planetary gearset RS1, than the brake A or, as the case may be, that the brake A is arranged closer to the input of the transmission than the brake B. In spatial terms, the brake B is arranged at least partially in an area radially above the first planetary gearset RS1, and the brake A, correspondingly, on the side of the first planetary gearset RS1 (near the drive) that further from the fourth planetary gearset RS4. An inner disc carrier of the brake A forms a section of the shaft 3 of the transmission and is non-rotatably connected with the sun gear SO1 of the first planetary gearset RS1 on the side of the first planetary gearset RS1 further from the fourth planetary gearset RS4. In sections, the shaft 3 is formed as a kind of sun shaft that connects the sun gears SO1, SO4 of the planetary gearsets RS1, RS4 to each other. In this case, the shaft 3 can rotate on either the drive shaft AN or a hub affixed to the transmission housing (not shown in detail in FIG. 1). An inner disc carrier of the brake B is non-rotatably connected, as shaft 4 of the transmission, with the ring rear HO1 of the first planetary gearset RS1.

The servo devices needed to activate the friction elements of the two brakes A, B are, for the purpose of simplification, not shown in more detail in FIG. 1 and can, for example, be integrated into the transmission housing GG or a housing cover affixed to the transmission housing or, as the case may be, be axially slidable.

The person skilled in the art will be able to spatially modify this exemplary arrangement of the two brakes A, B, if needed, without particular inventive effort.

The brake A, for example, could also at least partially be arranged radially above the first planetary gearset RS1, and the brake B at least partially radially above the fourth planetary gearset RS4. In yet another embodiment, the two brakes A, B, could, for example, also be arranged radially one above the other axially adjacent to the first planetary gearset RS1 on the side of that gearset that further from the fourth planetary gearset RS4, whereby the brake B is then arranged on a larger diameter than the brake A.

As can also be seen from FIG. 1, all three clutches C, D, E are spatially arranged at least partially in an area axially between the second and third planetary gearsets RS2, RS3. The servos necessary for activating the respective disc sets of the clutches C, D, E are not shown in FIG. 1 for the purpose of simplification.

Axially, the clutch E is immediately adjacent the second planetary gearset RS2. An outer disc carrier of the clutch E forms a section of the shaft 5 of the transmission, and is non-rotatably connected, on the one hand, with the ring gear HO2 of the second planetary gearset RS2 on a side closer to the second planetary gearset RS2, and, on the other hand, on a side further away from the second planetary gearset RS2 (via an outer disc carrier of the adjacent clutch C) with the sun gear SO3 of the third planetary gearset RS3. An inner disc carrier of the clutch E forms a section of the shaft 7 of the transmission and is non-rotatably connected to the sun gear SO2 of the second planetary gearset RS2, which in turn is permanently and non-rotatably connected with the coupled carrier ST4 of the fourth planetary gearset RS4. The servo necessary for activation of the disc set of the clutch E can, for example, be axially displacable and located on the aforementioned inner disc carrier of the clutch E and constantly rotate at the rotational speed of the shaft 7. However, it can also be provided that the servo of the clutch E is arranged inside the cylinder space formed by the outer disc carrier of the clutch E, that the servo of the clutch E is axially displacable and located on this outer disc carrier of the clutch E and then rotates constantly at the rotational speed of the shaft 5. In order to compensate for the rotational pressure of its rotating pressure chamber, the servo of the clutch E can dynamically compensate for this pressure in the known manner.

As can also be seen from FIG. 1, the clutch C is axially adjacent the side of the clutch E further from the second planetary gearset RS2 and faces the third planetary gearset RS3. The outer disc carrier of the clutch C thereby forms a section of the shaft 5 of the transmission and is non-rotatably connected, on the one hand, on a side closer the second planetary gearset RS2 (via the outer disc carrier of the clutch E) with the ring gear HO2 of the second planetary gearset RS2 and, on the other hand, on a side further from the second planetary gearset RS2, with the sun gear SO3 of the third planetary gearset RS3. An inner disc carrier of the clutch C forms a section of the shaft 1 of the transmission and is non-rotatably connected to the ring gear HO4 of the fourth planetary gearset RS4 and with the input shaft AN. The servo necessary for activating the disc set of the clutch C can, for example, be axially displacable and located on the inner disc carrier of the clutch C and then constantly rotate at the rotational speed of the shaft 1 or, as the case may be, the input shaft AN. However, it can also be provided that the servo of the clutch C is arranged inside the cylinder space formed by the outer disc carrier of the clutch C, such that the servo of the clutch C is axially displacable and located on this outer disc carrier of the clutch C and constantly rotates at the rotational speed of the shaft 5. In order to compensate for the rotational pressure of its rotating pressure chamber, the servo of the clutch C can dynamically compensate for this pressure in the known manner.

As an embodiment favorable for the use of non-variable parts, it is provided, for example, that the disc sets of the two adjacent clutches C, E are arranged at the same diameter. In terms of construction technology, it can also be advantageous to provide a common one-piece outer disc carrier for the two adjacent clutches C, E.

In a constructive embodiment that differs from FIG. 1, it can also, for example, be provided, in spatial terms, that the disc sets of the two clutches C, E are also arranged radially one above the other. If, in this case, the disc set of the clutch E is at least partially arranged radially above the disc set of the clutch C, a common disc carrier for the two clutches C, E could advantageously be configured as an inner disc carrier for the (radially outer) clutch E, and as an outer disc carrier for the (radially inner) clutch C, and be connected on the side of the disc sets C, E facing the third planetary gearset RS3 with the coupling shaft that connects the ring gear HO2 and the sun gear SO3. If, on the other hand, the disc set of the clutch C is, in spatial terms, at least partially radially arranged above the disc set of the clutch E, a common disc carrier for the two clutches C, E could advantageously be configured as an inner disc carrier for the (radially outer) clutch C, and as an outer disc carrier for the (radially inner) clutch E, and be connected on the side of the disc sets C, E facing the second planetary gearset RS2 with the coupling shaft that connects the ring gear HO2 and the sun gear SO3.

As can also be seen from FIG. 1, the clutch D, in spatial terms, is adjacent to the third planetary gearset RS3. An inner disc carrier of the clutch D thereby forms a section of the shaft 8 of the transmission and is non-rotatably connected on the side of the second third planetary gearset RS2 facing the fourth planetary gearset RS4, with the carrier ST2 of the former. The shaft 8 thereby completely overlapping the second planetary gearset RS2 and the two clutches C, E in an axial direction. An outer disc carrier of the clutch D forms a section of the shaft 2 of the transmission and is non-rotatably connected to the carrier ST3 of the third planetary gearset RS3 on the side of the disc set of clutch D facing the third planetary gearset RS3. Carrier ST3 is, in turn, connected with the output shaft AB of the transmission. The servo necessary for activating the disc set of the clutch D can be arranged, for example, inside the cylinder space that is formed by the outer disc carrier of the clutch D or, as the case may be, by the shaft 2, can be axially displacably disposed on the outer disc set of the clutch D or, as the case may be, on the shaft 2, and then rotate constantly at the rotational speed of this shaft 2. It can, however, also be provided that the servo of the clutch D is axially displacable located on the previously mentioned inner disc carrier of the clutch D or, as the case may be, on the shaft 8 and rotate constantly at the rotational speed of the shaft 8. In this case, the pressure chamber of the servo of the clutch D can be arranged, for example, near the disc set of the clutch D or, as the case may be, near the third planetary gearset RS3, but, for example, also near the second planetary gearset RS2 in an area axially between the second and fourth planetary gearsets RS2, RS4, and also, for example, even in an area axially between the fourth and first planetary gearsets RS4, RS1. In order to compensate for the rotational pressure of the rotating pressure chamber, the servo of the clutch D can dynamically compensate for the pressure in the known manner.

For the person skilled in the art, it is also obvious that the spatial arrangement of the clutch D inside the transmission housing GG can be comparatively simply modified relative to the embodiment shown in FIG. 1. It can, therefore, be provided in an embodiment deviating from FIG. 1 that the disc set of the clutch D, in spatial terms, is arranged in an area radially above the disc sets of the two other clutches C, E. In a further embodiment, the clutch D can, for example, be at least partially arranged in an area radially above the second planetary gearset RS2, such that a section of the shaft 2 largely overlaps the two clutches C, E in an axial direction. In a further embodiment, it can also be provided, for example, that the clutch D, in spatial terms, is arranged in an area axially between the second and fourth planetary gearsets RS2, RS4, whereby a section of the shaft 2 then completely overlaps the two clutches C, E, in an axial direction and the second planetary gearset RS2, at least partially in an axial direction.

As can also be seen from FIG. 1, the shaft 6, being a coupling shaft between the carrier ST1 of the first planetary gearset RS1 and the ring gear HO3 of the third planetary gearset RS3, completely overlaps, along its axial length, the fourth and second planetary gearsets RS4, RS2, as well as the clutches E, C, D.

It is expressly pointed out that the arrangement of the three clutches C, D, E as described above is only to be considered as an example. If needed, the person skilled in the art can modify the exemplary spatial arrangement of the three clutches C, D, E. Numerous suggestions for this are, for example, seen in the generic patent application DE 10 2005002337.1.

Figure 2:
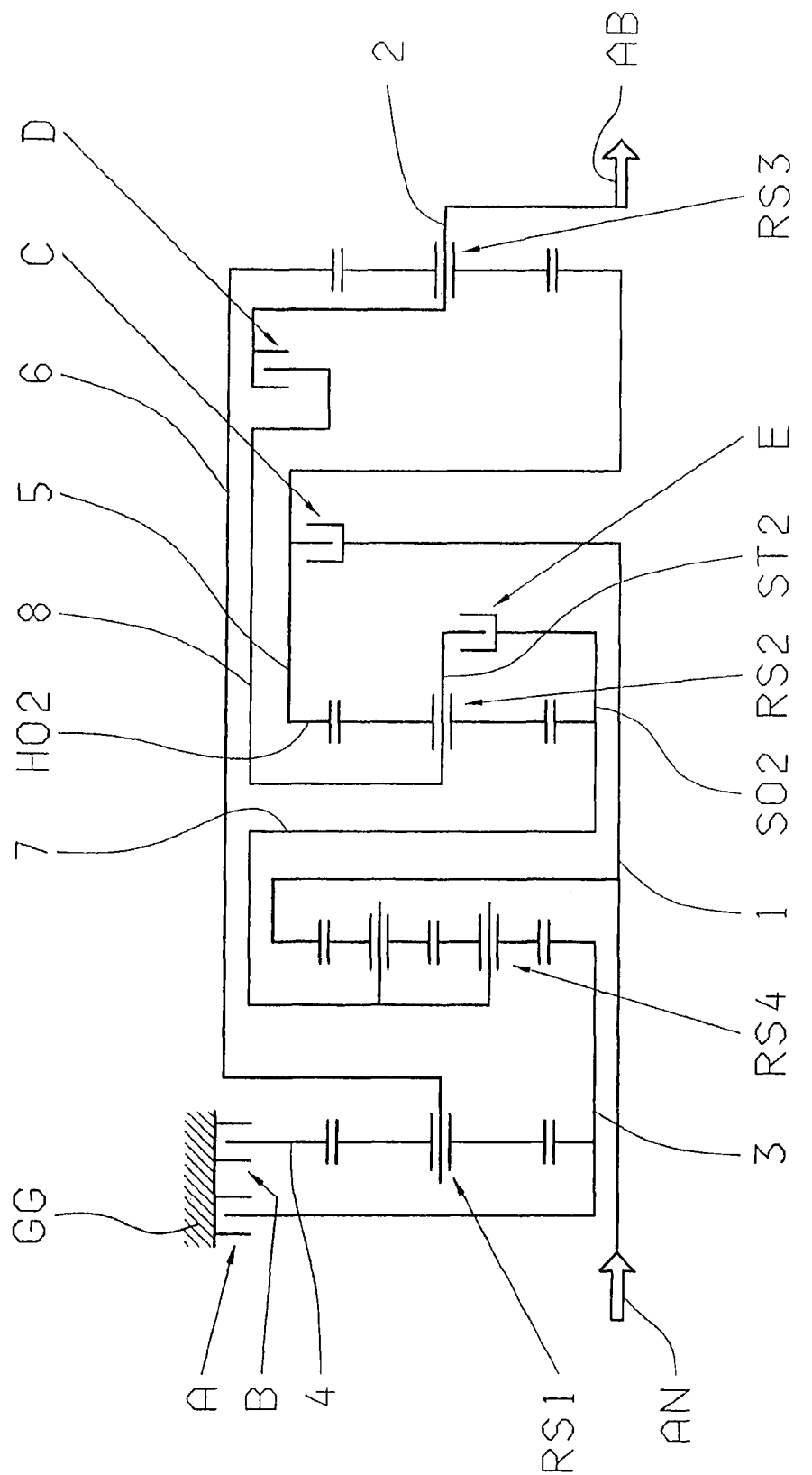
FIG. 2 is a schematic presentation of a second embodiment of a multi-speed transmission according to the invention.
Figure 3:
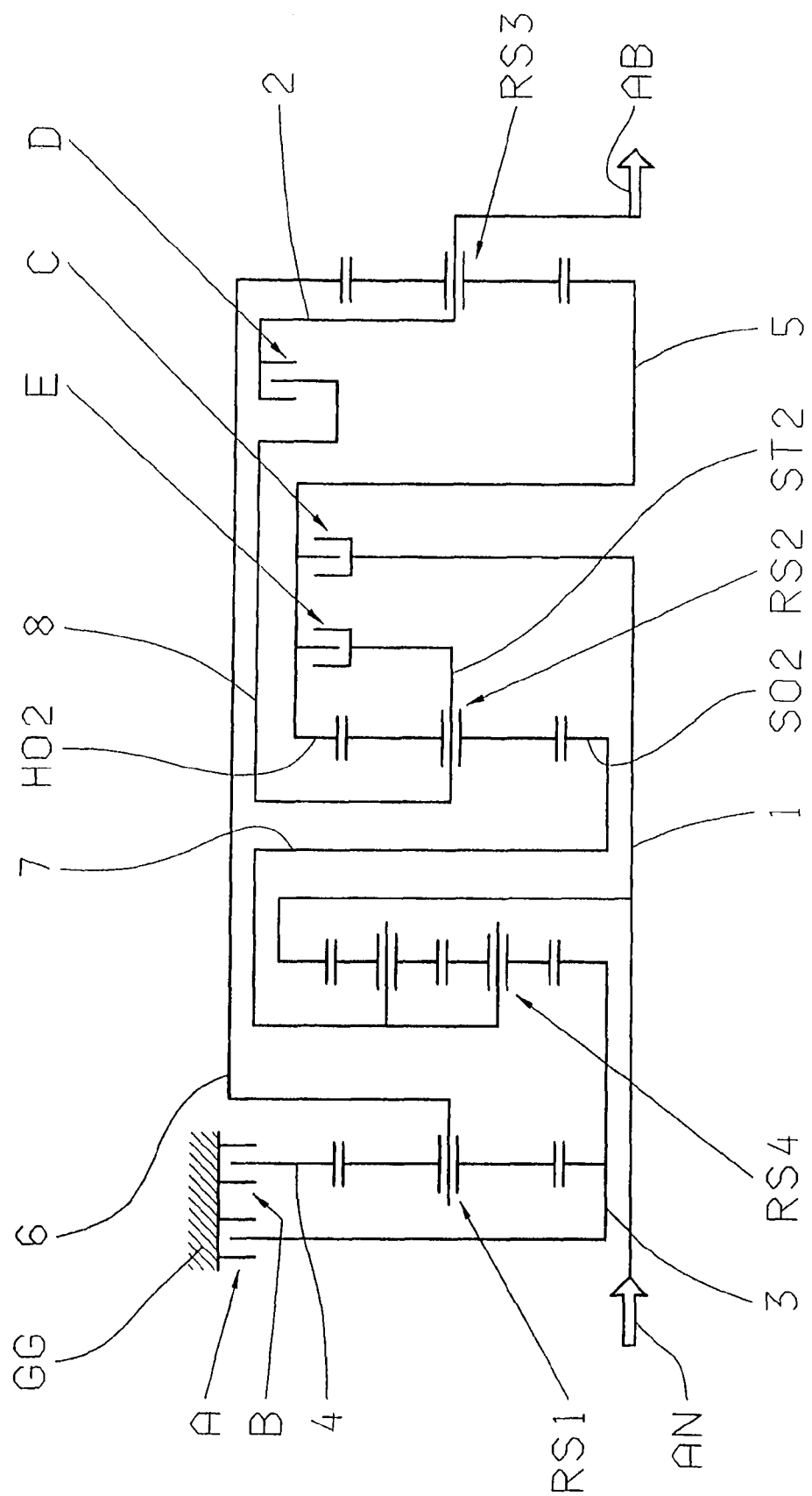
FIG. 3 is a schematic presentation of a third embodiment of a multi-speed transmission according to the invention.

Based on the consideration that clutch E, as the fifth shifting element of the transmission, locks the second planetary gearset RS2 when in engaged or, as the case may be, engaged state, the following two embodiments of an inventive multi-speed transmission present two other possibilities for blocking the aforementioned second planetary gearset RS2 by way of the aforementioned clutch E. FIG. 2 shows a second embodiment and FIG. 3 shows a third embodiment of an inventive multi-speed transmission, again in simplified schematic presentation, both being based on the embodiment previously explained in detail as based on FIG. 1.

It can be easily seen in FIG. 2 that the only difference between the second embodiment of an inventive multi-speed transmission shown here and that in FIG. 1 is that the clutch E is now arranged in the direction of power flow between shaft 7 and shaft 8. In engaged or, as the case may be, engaged state, the clutch E now thus connects the sun gear SO2 and the carrier ST2 of the planetary gearset RS2.

In the embodiment shown in FIG. 2, the clutch E, immediately adjacent the second planetary gearset R2, is arranged, in spatial terms, in an area axially between the second and third planetary gearsets RS2, RS3. The disc set of the clutch E, for example, is thereby arranged at a smaller diameter than the disc set of the adjacent clutch C. It is easily discernable for the person skilled in the art that, unlike the presentation in FIG. 2, it can also be provided that the disc sets of the two clutches C, E are arranged, in spatial terms, radially one above the other, or that the disc set of the clutch E can be arranged at a larger diameter, or that the disc sets of the two clutches C, E can also be arranged at an at least similar diameter, or that the disc sets of the two clutches C, D can be arranged, in spatial terms, radially one above the other.

It can also be provided, for example, in another constructive embodiment of the transmission different from FIG. 2, that clutch E is arranged, in spatial terms, axially adjacent the second planetary gearset RS2 in an area axially between the fourth planetary and the second planetary gearsets RS4, RS2.

It can be easily seen in FIG. 3, that the only difference between the third embodiment of the inventive multi-speed transmission shown here and that of FIG. 1 is the clutch E is now arranged in the direction of power flow between the shaft 5 and the shaft 8. In an engaged or, as the case may be, engaged state, the clutch E now connects the carrier ST2 and the ring gear HO2 of the planetary gearset RS2.

FIG. 4 shows an exemplary shift pattern, as it could be provided for the inventive multi-speed transmission according to FIGS. 1, 2, and 3. In each gear, three shifting elements are engaged and two shifting elements are disengaged. In addition to the gearshift logic, the shift pattern also provides exemplary values for the respective ratios i of the individual gear steps and the gear steps φ determined from them. The specified ratios i are derived from the (typical) stationary transmission ratios of the four planetary gearsets RS1, RS2, RS3, RS4 of minus 2.00, minus 1.60, minus 3.70, and plus 3.00. In addition, the shift pattern shows that double shifting or, as the case may be, range shifting can be avoided by sequential shifting, because two adjacent gears in the gearshift logic have two shifting elements in common. The sixth gear is configured as a direct gear.

The first forward gear is obtained by engaging the brakes A and B and the clutch C, the second forward gear by engaging the brakes A and B and the clutch E, the third forward gear by engaging the brake B and the clutches C and E, the fourth forward gear by engaging the brake B and the clutches D and E, and the fifth forward gear by engaging the brake B and the clutches C and D, the sixth forward gear by engaging the clutches C, D, and E, the seventh forward gear by engaging the brake A and the clutches C and D, and the eighth forward gear by engaging the brake A and the clutches D and E. As is also shown by the shift pattern, the reverse gear is obtained by engaging the brakes A and B and the clutch D.

According to the invention, the motor vehicle can be started with a shifting element integrated into the transmission. A shifting element particularly suited for this is one required in both the first forward gear and the reverse gear, in this case preferably the brake A or the brake B. Advantageously, these two brakes A, B are also required in the second forward gear. If the brake B is used as a starting element integrated into the transmission, starting is then even possible in the first five forward gears and the reverse gear. As can be seen from the shift pattern, clutch C can also be used as an internal starting element of the transmission for initiating drive in a forward direction, and the clutch D for initiating in a reverse direction.

Figure 5:
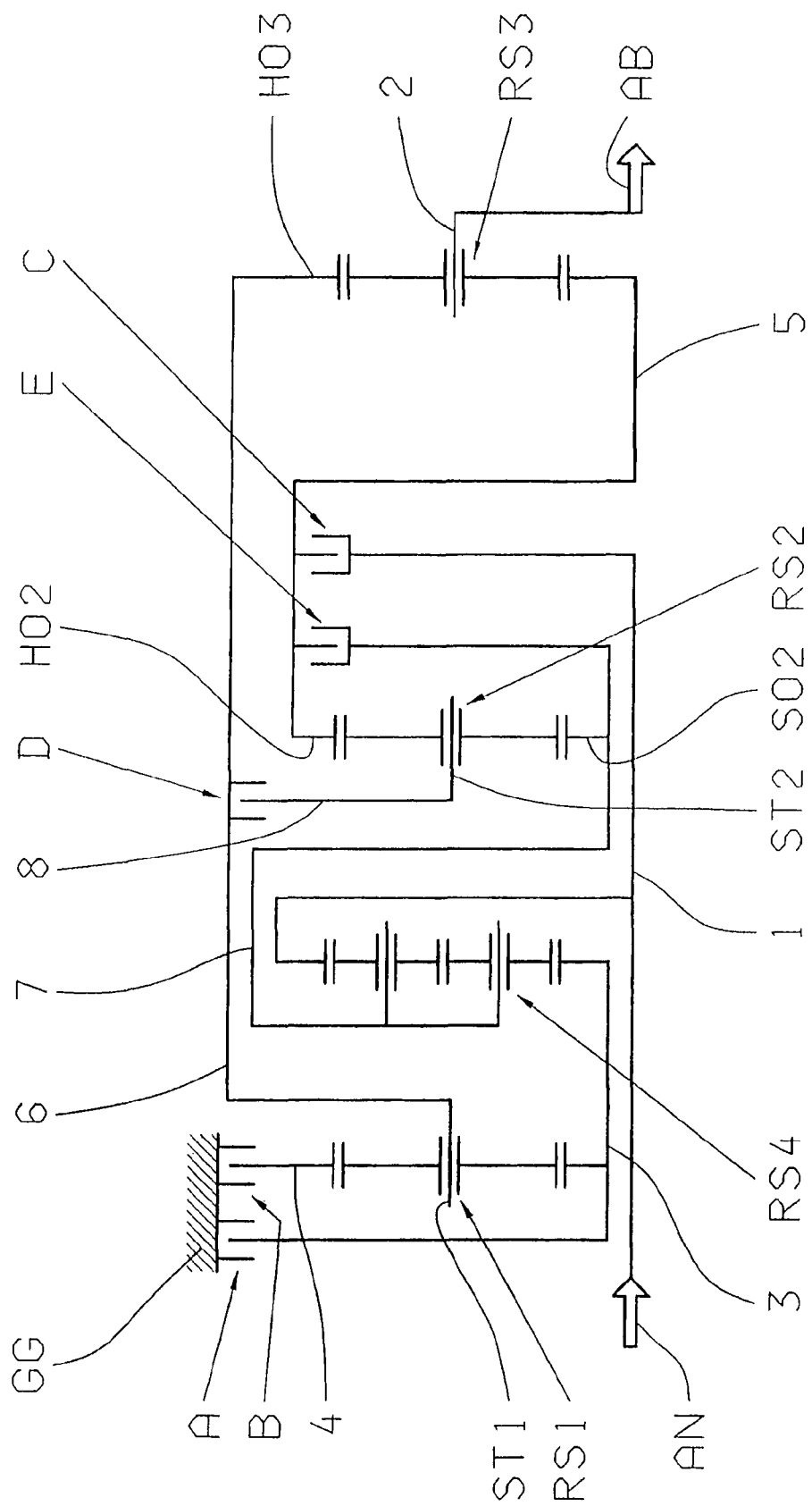
FIG. 5 is a schematic presentation of a fourth embodiment of a multi-speed transmission according to the invention.

FIG. 5 now shows a schematic presentation of a fourth embodiment of an inventive multi-speed transmission, based on the first embodiment described in detail using FIG. 1. The only difference, when compared to FIG. 1, is the changed kinematic connection of the fourth shifting element D to the planetary gearsets. According to FIG. 5, the clutch D is arranged in the direction of power flow between the shaft 6 and the shaft 8 of the transmission. In the engaged or, as the case may be, engaged state, clutch D thus connects the carrier ST2 of the second planetary gearset RS2 to the coupling shaft, which permanently connects the carrier ST1 of the first planetary gearset RS1 and the ring gear HO3 of the third planetary gearset RS3 to each other.

In the execution embodiment shown in FIG. 5, the clutch D, in spatial terms, is arranged in an area axially between the fourth and second planetary gearsets RS4, RS2, and thereby adjacent to the second planetary gearset RS2. An inner disc carrier of the clutch D is thereby connected to the carrier ST2 of the second planetary gearset RS2 and forms a section of shaft 8. Correspondingly, an outer disc carrier of the clutch D forms a section of the shaft 6. If required, the person skilled in the art could modify the spatial position of the disc set of the clutch D as shown in FIG. 5. The person skilled in the art will also provide a suitable spatial arrangement of the servo device, which is not shown in detail in FIG. 5, of clutch D for actuating the clutch's disc set; for example, the pressure chamber and the pressure compensation space of the servo of the clutch D can be arranged near the third planetary gearset RS3 or in an area axially between the first and fourth planetary gearsets RS1, RS4.

Figure 6:
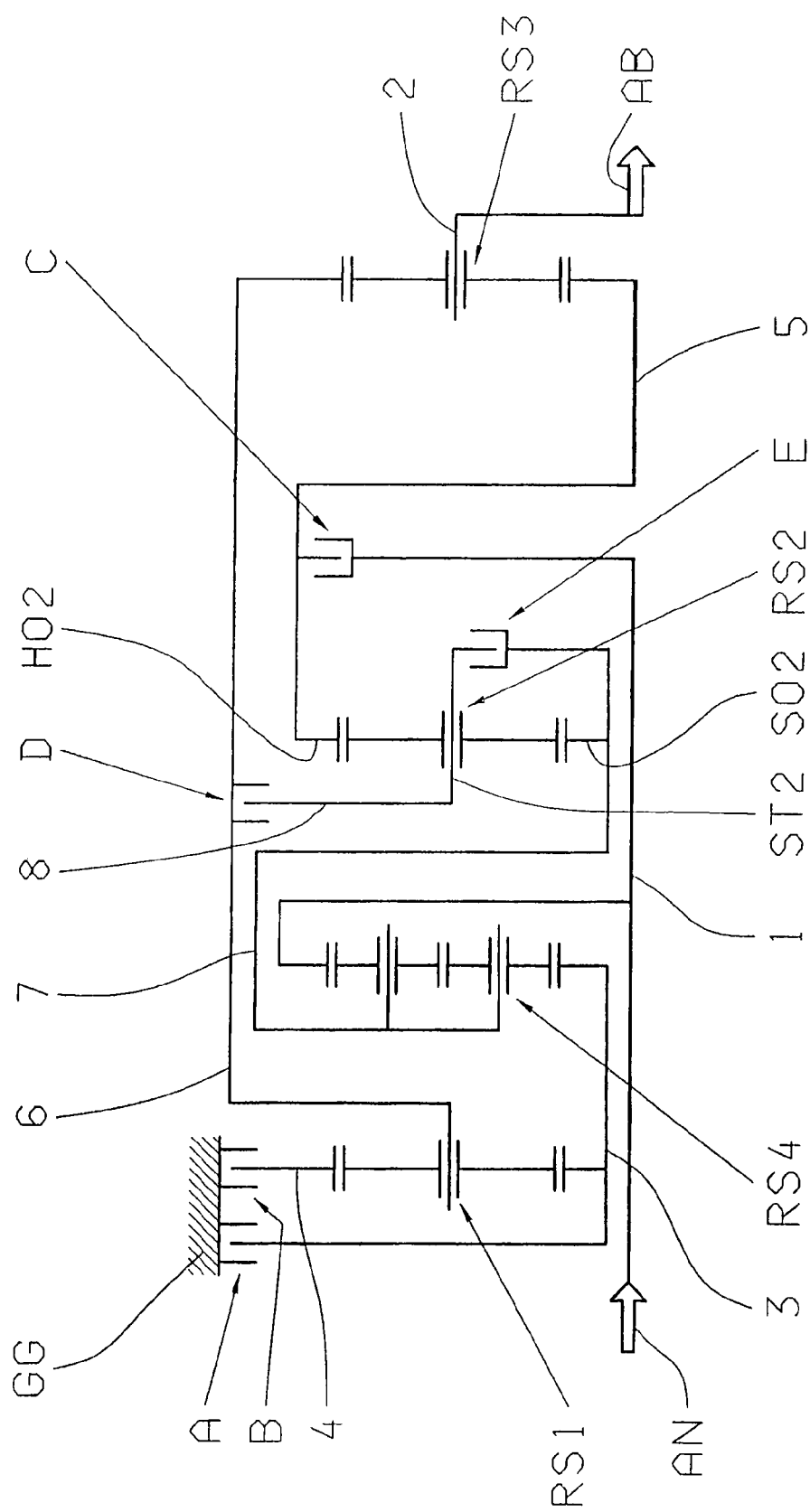
FIG. 6 is a schematic presentation of a fifth embodiment of a multi-speed transmission according to the invention.

Based on the knowledge that clutch E locks the second planetary gearset RS2 in an engaged or, as the case may be, engaged state, as in FIG. 1, the following two embodiments show two other possibilities to lock the second planetary gearset RS2 with the clutch E. FIG. 6 shows a fifth embodiment and FIG. 7 a sixth embodiment of an inventive multi-speed transmission, again in simplified schematic presentation, are both based on the fourth embodiment shown in FIG. 5.

It can be easily seen in FIG. 6 that the only difference between the fifth embodiment of the inventive multi-speed transmission shown here and in FIG. 5 is that the clutch E is now arranged in the direction of power flow between shaft 7 and shaft 8. In the engaged or, as the case may be, engaged state, the clutch E connects the sun gear SO2 and carrier ST2 of the planetary gearset RS2. The kinematic coupling of the clutch E to the second planetary gearset RS2 is, therefore, identical in FIG. 2 and FIG. 6. In that respect, the statements regarding the spatial arrangement of the clutch E, made in connection with FIG. 2, also apply here.

Figure 7:
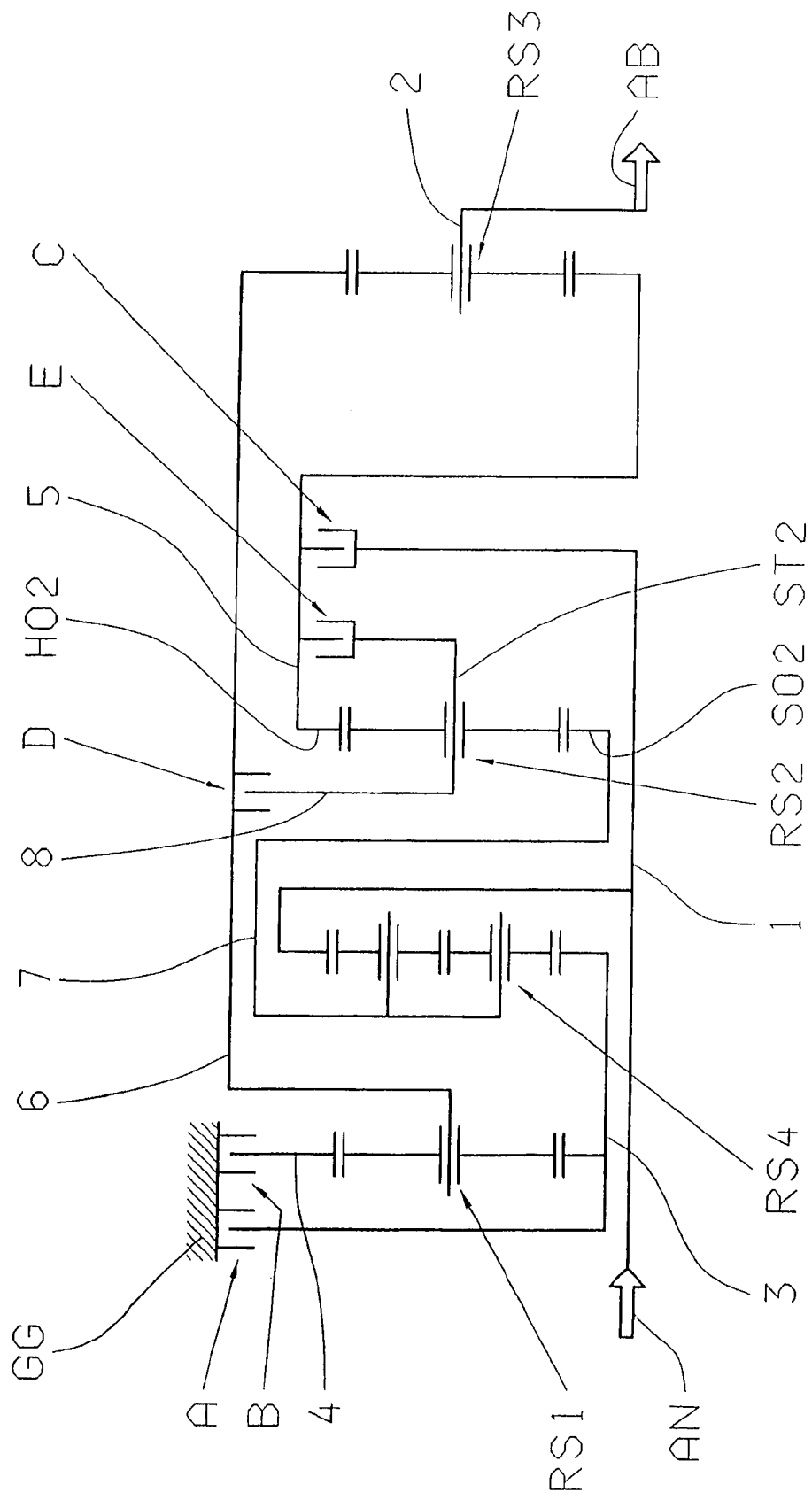
FIG. 7 is a schematic presentation of a sixth embodiment of a multi-speed transmission according to the invention.

It can easily be seen in FIG. 7 that the only difference between the sixth embodiment of an inventive multi-speed transmission shown here and that shown in FIG. 5 is that the clutch E is now arranged in the direction of power flow between the shaft 5 and the shaft 8. In an engaged or, as the case may be, engaged state, the clutch E connects the carrier ST2 and the ring gear HO2 of the planetary gearset RS2. The kinematic coupling of the clutch E to the second planetary gearset RS2 is therefore identical in FIGS. 3 and 7.

FIG. 8 shows an exemplary shift logic and exemplary gear ratios as they could be provided for the inventive multi-speed transmission according to FIGS. 5, 6, and 7. The specified shift logic corresponds to that of the shift pattern according to FIG. 4: in each gear, three shifting elements are engaged and two shifting elements are disengaged. The exemplary values specified in FIG. 8 for the respective ratios i of the individual gear ratios and the gear steps φ therefrom derived are in part slightly different from the values shown in FIG. 4, but are obtained on the basis of the same (typical) stationary transmission ratios of the four planetary gearsets RS1, RS2, RS3, RS4 of minus 2.00, minus 1.60, minus 3.70, and plus 3.00, as in FIG. 4.

In addition, the following applies to all previously presented or, as the case may be, described embodiments of the inventive multi-speed transmission.

According to the invention, different gear transitions may be obtained, even with the same transmission diagram, depending on the stationary transmission ratios of the individual planetary sets, to enable variations specific to use or, as the case may be, vehicle type.

Figure 14:
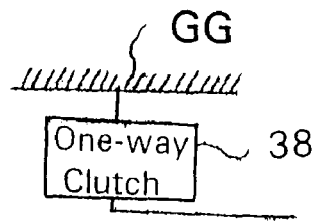
FIG. 14 is a diagrammatic view of an embodiment of the inventive multi-speed transmission having a one-way clutch.

It is also possible, as shown in FIG. 14, to provide additional one-way clutches 38 at any suitable position of the multi-speed transmission, for example, between a shaft and the housing or possibly to connect two shafts.

Figure 9:
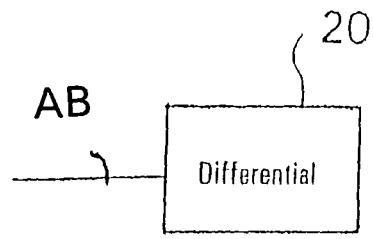
FIG. 9 is a diagrammatic view of an embodiment of the inventive multi-speed transmission having a differential.

An axle differential and/or a distributor differential 20 can be arranged on the input side or the output side, as shown in FIG. 9.

Figure 10:
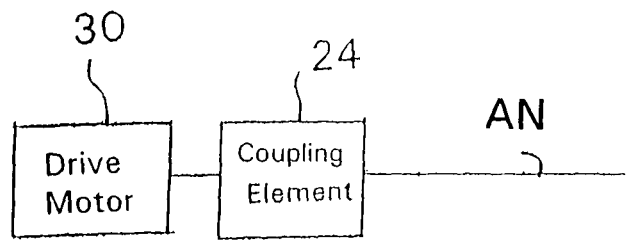
FIG. 10 is a diagrammatic view of an embodiment of the inventive multi-speed transmission with a coupling element and a drive motor.
Figure 11:
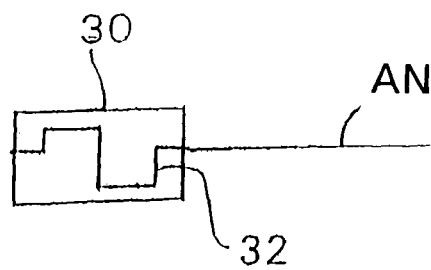
FIG. 11 is a diagrammatic view of an embodiment of the inventive multi-speed transmission with a crankshaft of the drive motor fixed to an input shaft of the multi-speed transmission.
Figure 18:
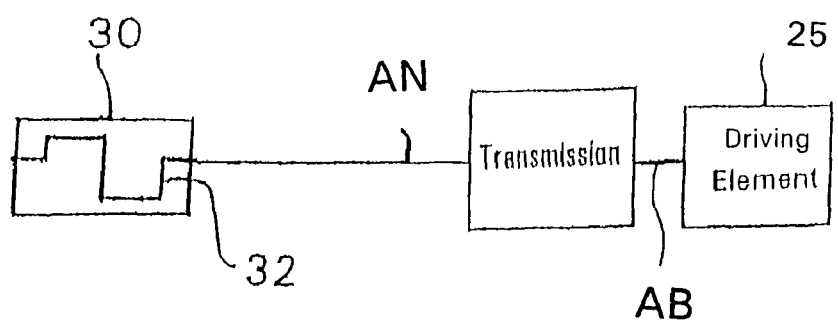
FIG. 18 is a diagrammatic view of another embodiment of the inventive multi-speed transmission with the crankshaft of the drive motor fixed to the input shaft of the multi-speed transmission and the coupling element located behind the multi-speed transmission.

As part of an advantageous further embodiment, as shown in FIG. 10, the input shaft AN can be separated from a drive motor 30, if required, by way of a coupling element 24, whereby the coupling element can be a hydrodynamic converter, a hydraulic clutch, a dry starting clutch, a wet starting clutch, a magnetic power clutch, or a centrifugal clutch. It is also possible, as shown in FIG. 18, to arrange this kind of a driving element behind the transmission in the direction of the force-flow, whereby in this case, the input shaft AN is permanently connected with the crankshaft 32 of the drive motor 30, as shown in FIG. 11.

Figure 12:
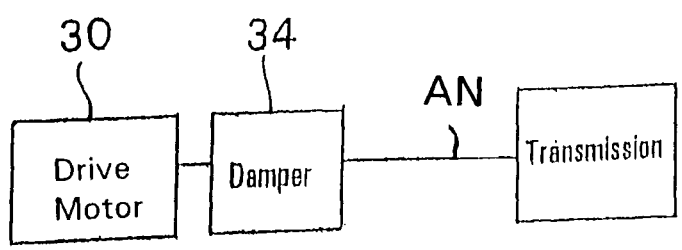
FIG. 12 is a diagrammatic view of an embodiment of the inventive multi-speed transmission having the drive motor communicating with a damper.

In addition, the inventive multi-speed transmission, as shown in FIG. 12, also enables the arrangement of a torsional vibration damper 34 to be provided between the drive motor 30 and the transmission.

Figure 13:
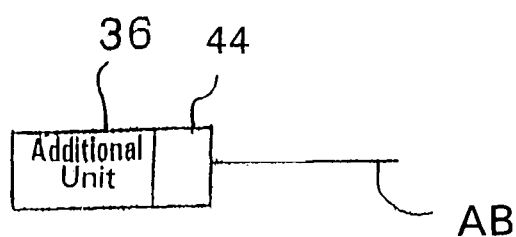
FIG. 13 is a diagrammatic view of an embodiment of the inventive multi-speed transmission with a power take-off for driving an additional unit.
Figure 17:
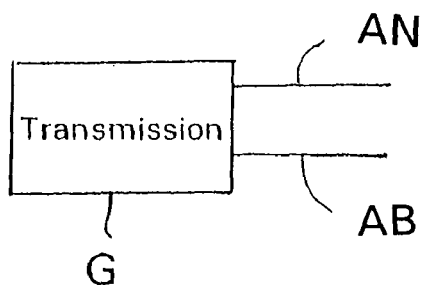
FIG. 17 is a diagrammatic view of a further embodiment of the invention with the input and the output being provided on the same side of the multi-speed transmission housing.
Figure 17A:
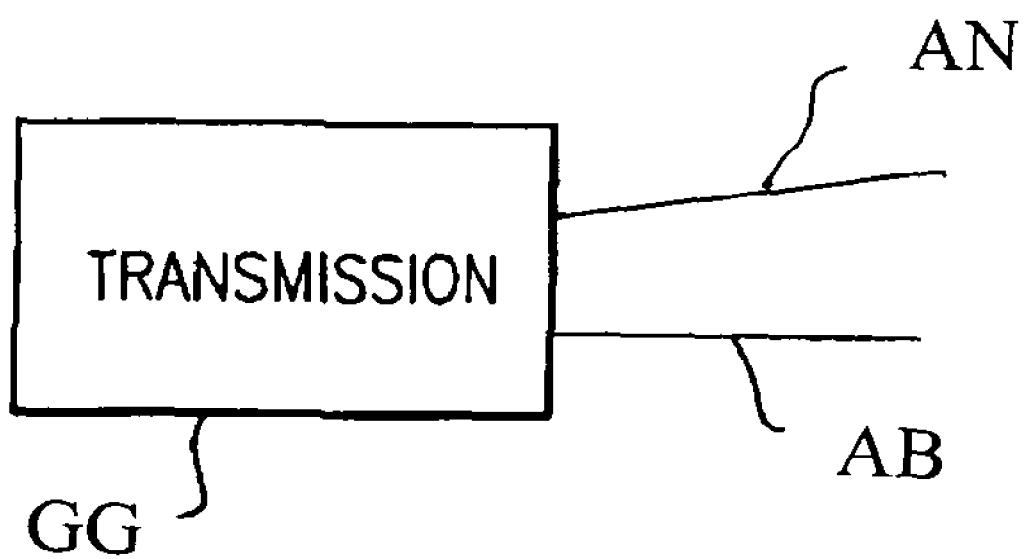
FIG. 17A is a diagrammatic view showing the input shaft at an angle with respect to the output shaft.

As part of an additional embodiment of the invention, as shown in FIG. 6, a wear-free brake 42, such as a hydraulic or electric retarder, for example, or a similar device, can be arranged on each shaft, preferably on the input shaft AN or the output shaft AB, this being particularly important for use in commercial motor vehicles. In addition, as shown in FIG. 13, a power take-off 44 can be provided for driving additional units 36 on each shaft, preferably on the input shaft AN or the output shaft AB. Additionally, as shown in FIG. 17, the input and the output are provided on the same side of the housing GG. Alternatively, as shown in FIG. 17A, the input shaft AN can be at an angle with respect to the output shaft AB.

The shifting elements used can be configured as powershift clutches or powershift brakes. In particular, friction-lock brakes and/or friction-lock clutches can be used, such as disc clutches, band brakes, and/or cone clutches, for example. In addition, form-locking brakes and/or form-locking clutches, such as synchronization devices or claw clutches can be used as shifting elements.

Figure 15:
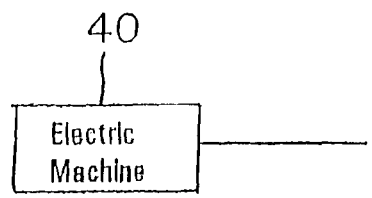
FIG. 15 is a diagrammatic view of an embodiment of the inventive multi-speed transmission with an electric machine.
Figure 16:
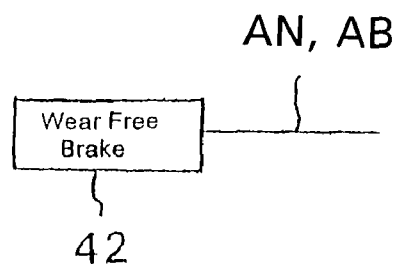
FIG. 16 is a diagrammatic view of a preferred design of the inventive multi-speed transmission having a wear free brake.

A further advantage of the multi-speed transmission, presented here in FIG. 15, is that an electric machine 40 can be attached to each shaft as a generator and/or an additional drive unit.

Of course every constructive design, in particular any spatial arrangement of the planetary gearsets and the shifting elements as such and in relation to each other, fall under the scope of protection of the present claims and as far as technically reasonable, without affecting the function of the transmission, as specified in the claims, even when these designs are not explicitly presented in the figures or the description.

Reference numerals
1 first shaft
2 second shaft
3 third shaft
4 fourth shaft
5 fifth shaft
6 sixth shaft
7 seventh shaft
8 eighth shaft
A first shifting element, first brake
B second shifting element, second brake
C third shifting element, first clutch
D fourth shifting element, second clutch
E fifth shifting element, third clutch
AB output shaft
AN input shaft
GG housing
RS1 first planetary gearset
HO1 ring gear of the first planetary gearset
SO1 sun gear of the first planetary gearset
ST1 carrier of the first planetary gearset
PL1 planetary gears of the first planetary gearset
RS2 second planetary gearset
HO2 ring gear of the second planetary gearset
SO2 sun gear of the second planetary gearset
ST2 carrier of the second planetary gearset
PL2 planetary gears of the second planetary gearset
RS3 third planetary gearset HO3 ring gear of the third planetary gearset
SO3 sun gear of the third planetary gearset
ST3 carrier of the third planetary gearset
PL3 planetary gears of the third planetary gearset
RS4 fourth planetary gearset
HO4 ring gear of the fourth planetary gearset
SO4 sun gear of the fourth planetary gearset
ST4 carrier of the fourth planetary gearset
PL4a outer planetary gears of the fourth planetary gearset
PL4i inner planetary gears of the fourth planetary gearset
i ratio
φ gear step

The invention claimed is:

1. A multi-speed automatic transmission of a planetary design for a motor vehicle, the transmission comprising:
an input shaft (AN), an output shaft (AB)
first, second, third and fourth planetary gearsets (RS1, RS2, RS3, RS4), and each of the first, the second, the third and the fourth planetary gearsets (RS1, RS2, RS3, RS4) comprising a sun gear, a carrier and a ring gear;
at least first, second, third, fourth, fifth, sixth, seventh and eighth rotatable shafts (1, 2, 3, 4, 5, 6, 7, 8), and first, second, third, fourth and fifth shifting elements (A, B, C, D, E), whose selective engagement creates different gear ratios between the input shaft (AN) and the output shaft (AB) so that eight forward gears and at least one reverse gear can be implemented;
wherein the carrier (ST3) of the third planetary gearset (RS3) and the output shaft (AB) are permanently connected and form the second shaft (2);
the sun gear (SO1) of the first planetary gearset (RS1) and the sun gear (SO4) of the fourth planetary gearset (RS4) are permanently connected and form the third shaft (3);
the ring gear (HO1) of the first planetary gearset (RS1) forms the fourth shaft (4);
the ring gear (HO2) of the second planetary gearset (RS2) and the sun gear (SO3) of the third planetary gearset (RS3) are permanently connected and form the fifth shaft (5);
the carrier (ST1) of the first planetary gearset (RS1) and the ring gear (HO3) of the third planetary gearset (RS3) are permanently connected and form the sixth shaft (6);
the carrier (ST2) of the second planetary gearset (RS2) forms the eighth shaft (8);
the first shifting element (A) is located, in a direction of power flow, between the third shaft (3) and a transmission housing (GG);
the second shifting element (B) is located, in the direction of power flow, between the fourth shaft (4) and the transmission housing (GG);
the third shifting element (C) is located, in the direction of power flow, between the first shaft (1) and the fifth shaft (5);
the fourth shifting element (D) is located, in the direction of power flow, between one of the second shaft (2) and the eighth shaft (8) and the sixth shaft (6) and the eighth shaft (8);
the fifth shifting element (E) is located, in the direction of power flow, between one of the fifth shaft (5) and the seventh shaft (7), the fifth shaft (5) and the eighth shaft (8) and the seventh shaft and the eighth shaft (8);
the ring gear (HO4) of the fourth planetary gearset (RS4) is permanently connected with the input shaft (AN) to form the first shaft (1); and
the sun gear (SO2) of the second planetary gearset (RS2) is permanently connected with the carrier (ST4) of the fourth planetary gearset (RS4) to form the seventh shaft (7).

2. The multi-speed transmission according to claim 1, wherein
a first forward gear results from engagement of the first shifting element (A), the second shifting element (B), and the third shifting element (C);
a second forward gear results from engagement of the first shifting element (A), the second shifting element (B), and the fifth shifting element (E);
a third forward gear results from engagement of the second shifting element (B), the third shifting element (C), and the fifth shifting element (E);
a fourth forward gear results from engagement of the second shifting element (B), the fourth shifting element (D), and the fifth shifting element (E);
a fifth forward gear results from engagement of the second shifting element (B), the third shifting element (C), and the fourth shifting element (D);
a sixth forward gear results from engagement of the third shifting element (C), the fourth shifting element (D), and the fifth shifting element (E);
a seventh forward gear results from engagement of the first shifting element (A), the third shifting element (C), and the fourth shifting element (D);
an eighth forward gear results from engagement of the first shifting element (A), the fourth shifting element (D), and the fifth shifting element (E); and
the reverse gear results from engagement of the first shifting element (A), the second shifting element (B), and the fourth shifting element (D).

3. The multi-speed transmission according to claim 1, wherein the first planetary gearset (RS1), the second planetary gearset (RS2), and the third planetary gearset (RS3) are negative-planetary gearsets and the fourth planetary gearset (RS4) is a positive-planetary gearset.

4. The multi-speed transmission according to claim 1, wherein the first planetary gearset (RS1), the second planetary gearset (RS2), the third planetary gearset (RS3) and the fourth planetary gearset (RS4) are co-axial and arranged, in an axial direction, in the following sequential order:
the first planetary gearset (RS1), the fourth planetary gearset (RS4), the second planetary gearset (RS2), and the third planetary gearset (RS3).

5. The multi-speed transmission according to claim 1, wherein the input shaft (AN) is one of axially parallel and at an angle to the output shaft (AB), and
one of the first planetary gearset (RS1) and the third planetary gearset (RS3) is located on a side of the transmission housing (GG) closest to a drive motor which functionally communicates with the input shaft (AN) of the transmission.

6. The multi-speed transmission according to claim 1, wherein the input shaft (AN) is co-axial with the output shaft (AB), and the first planetary gearset (RS1) is located on a side of the transmission housing (GG) closest to a drive motor, which functionally communicates with the input shaft (AN).

7. The multi-speed transmission according to claim 1, wherein at least one of the first shaft (1), the third shaft (3), the fifth shaft (5), the seventh shaft (7) and the eighth shaft (8) transverses, in an axial direction, a center of the first planetary gearset (RS1), the second planetary gearset (RS2), the third planetary gearset (RS3) and the fourth planetary gearset (RS4).

8. The multi-speed transmission according to claim 1, wherein at least the first shaft (1) transverses, in an axial direction, a center of the first planetary gearset (RS1), the second planetary gearset (RS2), and the fourth planetary gearset (RS4).

9. The multi-speed transmission according to claim 1, wherein a hub rotationally supports the third shaft (3) and is fixed to the transmission housing (GG).

10. The multi-speed transmission according to claim 1, wherein at least one of the first shifting element (A) and the second shifting element (B) is located, in spatial terms, at least partially in an area radially above one of the first planetary gearset (RS1) and the fourth planetary gearset (RS4).

11. The multi-speed transmission according to claim 1, wherein the first shifting element (A) is arranged, in spatial terms, axially parallel the second shifting element (B), and at least one friction element of the second shifting element (B) is closer to the fourth planetary gearset (RS4) than a friction element of the first shifting element (A).

12. The multi-speed transmission according to claim 1, wherein the first shifting element (A) and the second shifting element (B) are at least one of:
located adjacent one another, and
located substantially at a same radial position as one another.

13. The multi-speed transmission according to claim 1, wherein the fifth shifting element (E), in spatial terms, is adjacent the second planetary gearset (RS2).

14. The multi-speed transmission according to claim 1, wherein the fifth shifting element (E) is axially located, at least partially, between the second planetary gearset (RS2) and the third planetary gearset (RS3).

15. The multi-speed transmission according to claim 1, wherein the third shifting element (C) is axially located, at least partially, between the second planetary gearset (RS2) and the third planetary gearset (RS3).

16. The multi-speed transmission according to claim 1, wherein one of:
a disc pack of the third shifting element (C) is located, at least partially, radially above a disc pack of the fifth shifting element (E), and
the disc pack of the fifth shifting element (E) is located substantially at a same radial position as the disc pack of the third shifting element (C).

17. The multi-speed transmission according to claim 14, wherein the third shifting element (C) is arranged at least substantially axially parallel the fifth shifting element (E), and a disc pack of the third shifting element (C) is closer to the third planetary gearset (RS3) than a disc pack of the fifth shifting element (E).

18. The multi-speed transmission according to claim 1, wherein the fourth shifting element (D) is axially arranged, in spatial terms, at least partially between the second planetary gearset (RS2) and the third planetary gearset (RS3).

19. The multi-speed transmission according to claim 1, wherein the fourth shifting element (D) is axially arranged, in spatial terms, at least partially between the fourth planetary gearset (RS4) and the second planetary gearset (RS2).

20. The multi-speed transmission according to claim 1, wherein a disc set of the fourth shifting element (D) is adjacent the second planetary gearset (RS2).

21. The multi-speed transmission according to claim 1, wherein a disc set of the fourth shifting element (D) is adjacent the third planetary gearset (RS3).

22. The multi-speed transmission according to claim 1, wherein the sixth shaft (6), in an axial direction, completely overlies the fourth planetary gearset (RS4), the second planetary gearset (RS2), the third shifting element (C) and the fifth shifting element (E).

23. The multi-speed transmission according to claim 1, wherein the sixth shaft (6) in an axial direction completely overlies the fourth planetary gearset (RS4), the second planetary gearset (RS2), the third shifting element (C), the fourth shifting element (D), and the fifth shifting element (E).

24. The multi-speed transmission according to claim 1, wherein at least one one-way clutch is located between at least one of the input shaft (AN), the output shaft (AB), the first shaft (1), the second shaft (2), the third shaft (3), the fourth shaft (4), the fifth shaft (5), the sixth shaft (6), the seventh shaft (7) and the eighth shaft (8) and the transmission housing (GG).

25. The multi-speed transmission according to claim 1, wherein an input and an output of the transmission are provided on opposite sides of the housing (GG).

26. The multi-speed transmission according to claim 1, wherein an input and an output of the transmission are located on a common side of the housing (GG).

27. The multi-speed transmission according to claim 1, wherein at least one of an axle differential and a distributor differential is located on one of the input shaft (1) and the output shaft (2).

28. The multi-speed transmission according to claim 1, wherein an coupling element is located, in a direction of power flow, between a drive motor of the motor vehicle and the input shaft (AN), the coupling element is one of a hydrodynamic converter, a hydraulic clutch, a dry starting clutch, a wet starting clutch, a magnetic-power clutch and a centrifugal clutch.

29. The multi-speed transmission according to claim 1, wherein the vehicle is started via one of the first shifting element (A), the second shifting element (B), the third shifting element (C) and the fourth shifting element (D) of the transmission, and the input shaft (AN) is permanently connected to a crankshaft of a drive motor in one of a rotationally fixed manner and a rotationally elastic manner.

30. The multi-speed transmission according to claim 29, wherein the vehicle is started in a forward direction and a reverse direction via one of the first shifting element (A) and the second shifting element (B).

31. The multi-speed transmission according to claim 1, wherein one of a wear free brake, a power take-off for driving additional units, an electric machine is fixed to at least one of the input shaft (AN), the output shaft (AB), the first shaft (1), the second shaft (2), the third shaft (3), the fourth shaft (4), the fifth shaft (5), the sixth shaft (6), the seventh shaft (7) and the eighth shaft (8) of the transmission, the electric machine is at least one of a generator and an additional drive unit.

32. The multi-speed transmission according to claim 1, wherein each of the first shifting element (A), the second shifting element (B), the third shifting element (C), the fourth shifting element (D) and the fifth shifting element (E) is one of a friction-lock clutch, a friction-lock brake, a disc clutch, a band brake and a conical clutch, a form-locking clutch, a form-locking brake, a conical clutch and a claw clutch.

* * * * *